United States Patent [19]
Zambory

[11] Patent Number: 5,376,238
[45] Date of Patent: Dec. 27, 1994

[54] LATEX PAINT RECOVERY PROCESS BY VACUUM EVAPORATION

[75] Inventor: John G. Zambory, Brunswick, Ohio

[73] Assignee: The Glidden Company, Cleveland, Ohio

[21] Appl. No.: 933,741

[22] Filed: Aug. 24, 1992

[51] Int. Cl.$^5$ ............................................. B01D 3/10
[52] U.S. Cl. ........................................ 203/11; 203/14; 203/88; 203/91; 203/98; 203/DIG. 9; 134/12; 134/38; 159/2.1; 159/47.3; 159/901
[58] Field of Search ............... 203/11, 14, 88, 91, 203/98, DIG. 9; 159/47.3, 901, 2.1; 134/10, 12, 38; 202/205

[56] References Cited

U.S. PATENT DOCUMENTS

| | | | |
|---|---|---|---|
| 1,516,314 | 11/1924 | Sebald | 159/901 |
| 2,619,453 | 11/1952 | Andersen | 203/11 |
| 3,483,091 | 12/1969 | Metzger et al. | 203/11 |
| 3,505,173 | 4/1970 | Randell | 203/11 |
| 4,162,199 | 7/1979 | English | 203/39 |
| 4,708,775 | 11/1987 | McGregor et al. | 134/12 |
| 4,980,030 | 12/1990 | Johnson et al. | 159/47.3 |
| 5,183,540 | 2/1993 | Rubin | 203/41 |

*Primary Examiner*—Wilbur Bascomb, Jr.
*Attorney, Agent, or Firm*—Thomas M. Schmitz

[57] ABSTRACT

The process of this invention is directed to recovering diluted aqueous latex paint collected during cleaning of latex paint manufacturing equipment. The collected aqueous diluted latex paint is subjected to vacuum evaporation at temperatures between about 120° F. and 170° F. at reduced pressures of at least about 25 inches of mercury vacuum to produce a distillate containing above 99% by weight water and concentrated latex paint reusable as latex paint or as blend in latex paint products.

20 Claims, 2 Drawing Sheets

LATEX PAINT RECOVERY PROCESS BY VACUUM EVAPORATION

This invention pertains to a paint recovery process and more particularly to a process for recovering and re-using water diluted latex paint ordinarily lost in production facilities during the cleaning of plant equipment and interconnecting piping due to product change-overs.

BACKGROUND OF THE INVENTION

The paint recovery process of this invention provides an economical method for recovery and re-using latex paint lost during product change-overs in the plant manufacturing equipment. Lost paint is that part of the paint batch which remains on the sides of the mixing and thindown tanks as well as interconnecting process piping after the completed paint product has been discharged for filling of consumer containers. Typically the lost paint comprises about 1% by volume per batch. During product change over, filling equipment, piping and thindown tanks must be rinsed with water to remove residual latex paint before starting the next batch of paint. Prior to this invention, the residual paint typically was flushed out of the processing equipment and filling system with water, collected, and then flocculated. The flocculated solid waste was then filtered generating inordinate amounts of filter cake and solid paint wastes. The treated paint solids were landfilled while the effluent water was further biologically treated and/or sent to a publicly operated treatment works. Hence, the lost paint solids generated by cleaning processing equipment and related systems during product change over can represent significant amounts of lost product in addition to posing substantial environmental disposal problems. A large latex paint processing facility, for instance, can generate lost paint product valued in excess of one-half million dollars annually due to these losses.

It now has been found that latex paint processing waste collected by cleaning plant equipment with water can be collected as a dilute slurry, processed in a separator unit adapted to separate the waste slurry into a concentrated paint discharge resulting in increased solids content of at least delta 5% and preferably containing about 40% to 50% by weight paint solids in conjunction with a water distillate discharge comprising above about 99% by weight water. The concentrated paint can be recovered directly as usable paint while the water distillate can be recycled for subsequent cleaning or reused as make up water in a new batch of latex paint. The preferred separator unit comprises an evaporator separation process under vacuum so that evaporation temperatures can be minimized to avoid thermal degradation of the recovered paint product. The recovery process of this invention effectively eliminates the need for landfilling solids and disposal of dirty waste water according to conventional processes. This invention provides an effective and efficient paint recovery process where latex paint diluted with water is separated into a concentrated latex paint stream and a water stream. The process is particularly useful in recovering waste latex paint accumulated during the cleaning of latex paint manufacturing equipment and interconnecting pipes during product change over. These and other advantages of this invention will become more apparent by referring to the drawings and detailed description of the invention.

SUMMARY OF THE INVENTION

Briefly, the invention pertains to a process for recovering waste latex paint from plant processing equipment and related piping and filling facilities by cleaning the equipment with rinse water, collecting a water diluted latex paint, separating the dilute latex paint into at least two recovery streams, where the first recovery stream is concentrated latex paint and the second recovery stream is distillate containing about 99% (or more) by weight water. The concentrated paint recovery stream can be used directly as recovered paint or mixed with other paint products. The aqueous distillate recovery stream can be recycled as rinse water for cleaning plant equipment or as water in subsequent latex paint batches.

IN THE DRAWINGS

In the drawings, FIG. 1 is a block diagram illustrating the various unit operations comprising the process of this invention.

DETAILED DESCRIPTION OF THE INVENTION

Figure 1:
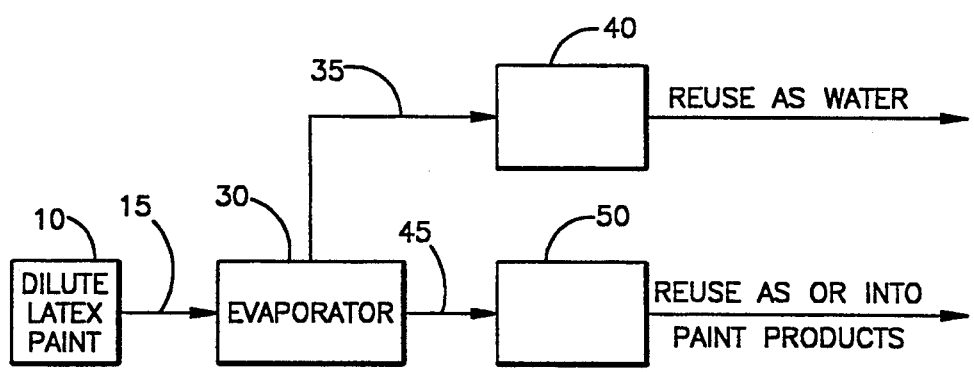

Referring now to the drawings where like reference characters designate like parts, shown generally is a block diagram illustrating the various preferred unit operations and process steps of this invention.

FIG. 1 is block diagram indicating a collecting tank 10 for collecting waste wash water containing diluted latex paint solids typically sourced from aqueous cleaning of latex paint manufacturing equipment such as mixing vessels, thindown tanks, filling equipment, and interconnecting pipelines. Ordinarily, the waste wash water stream comprises a dilute aqueous solution containing about 3% to 15% by weight latex paint solids where higher concentrations within this range are preferred. Higher concentrations above 15% and as high as 25% to 30% can be handled just as well although wash waters seldom exceed 15%. Concentrations below 3% solids and as low as 1% can be processes but are not preferred. Latex paint solids typically include latex polymer, pigment such as titanium dioxide, color pigments if the latex paint is other than white or off-white, filler pigments, and latex paint additives such as surfactants, flow control agents, and the like. Waste water from various sources are collected and accumulated in the collecting tank 10 which is interconnected by a connecting feed pipe 15 to the evaporator unit 30. The evaporator unit 30 is operative to partially separate the water from the latex paint solids in feed 15 to produce an aqueous distillate stream 35 comprising over 99% by weight water and a bottom concentrated aqueous latex paint stream 45 having increased solids of at least 5% relative to feed 15. The concentrated latex paint stream 45 is advantageously above 35%, and preferably containing above about 40% by weight paint solids, where typical desired paint solids are 40% to 50% or above. The dilute aqueous distillate stream 35 is collected in a holding tank 40 and recycled for reuse as make-up water in new latex paint products or for reuse as recycle wash water for cleaning latex paint manufacturing equipment. The concentrated stream 45 is collected in a separate holding tank 50 for reuse in latex paint products.

Figure 2:
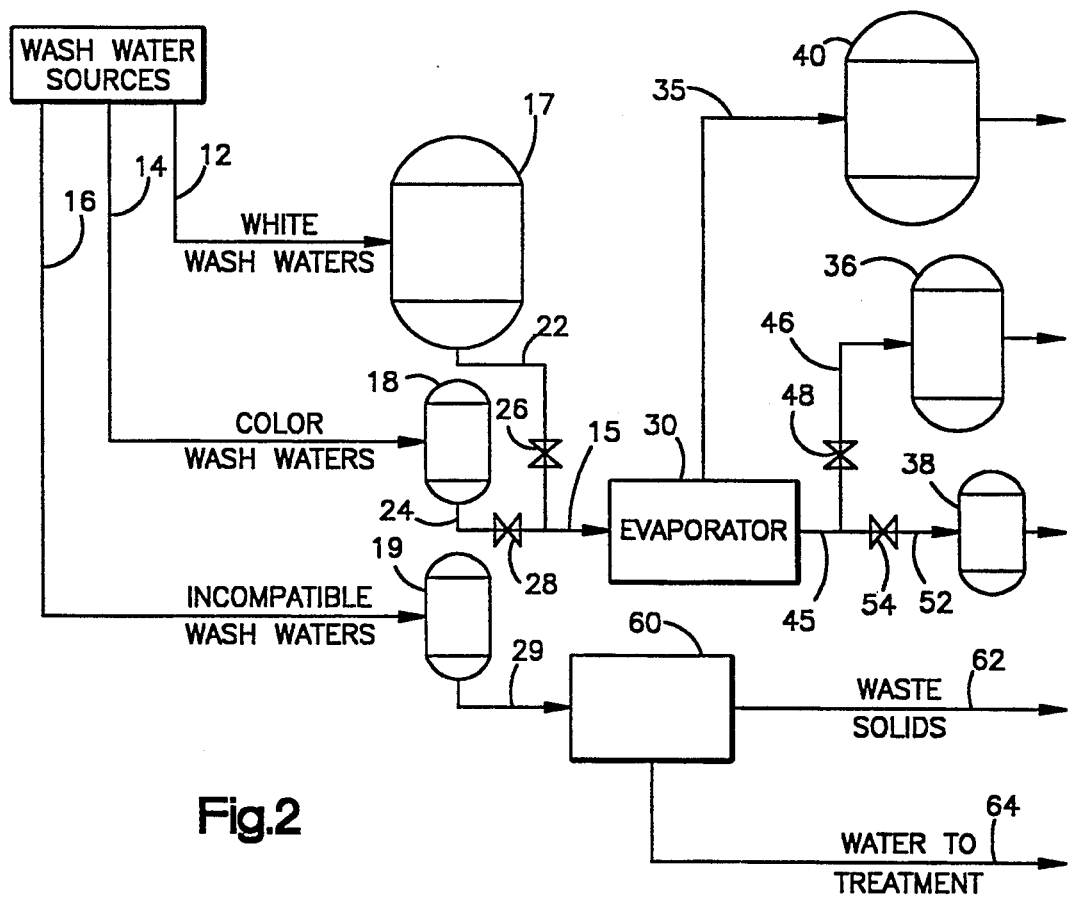
FIG. 2 is a more detailed representation of the process shown in FIG. 1.

In a preferred embodiment of this invention, wash water sources are preferably segregated, as shown in FIG. 2, into three different types of latex paint waste streams, where white and off-white latex paint waste is directed by stream 12 to a holding tank 17, color pigmented latex paint wash is directed by stream 14 to a separate holding tank 18, while incompatible waste water is diverted by stream 16 to a third holding tank 19 and passed by pipe line 29 to a treating unit 60. Incompatible wastes can be flocculated or treated in a conventional manner in the unit 60 which separates the incompatible wastes by coagulation or flocculation into solids 62 for landfilling and supernatent water 64 for water treatment before discharge.

As shown in detail in FIG. 2, the white and color pigmented latex wastes can be collected in separate units 17 or 18, but can be each treated individually in the same evaporator unit 30 in accordance with the process of this invention. The white and off-white pigmented latex paint wash water sources can be fed through line 12 to the accumulating tank 17 while color pigmented latex paint wash water sources can be directed by line 14 to accumulating tank 18. White waste water from accumulating tank 17 can be directed to the evaporator 30 through feed line 22 where flow can be controlled by valve 26 to interconnect with main feed line 15 to the evaporator 30. Similarly, color waste water is discharged through feed line 24 where flow is controlled by valve 28 to interconnect with main feed line 15. Either white waste water or color waste water can be fed through feed line 15 to the evaporator 30 wherein white wastes and color wastes can be processed separately, although, if desired, white and color wastes can be combined and fed simultaneously by feed line 15 to evaporator 30.

In either white or color waste processing, the distillate water is collected in tank 40 as reusable make-up water in new latex paints or recycled water for use as wash water. The concentrated white or color paint products emerging from evaporator unit 30 by pipeline 45 can be maintained as separate product lines where white concentrate can be directed to a collecting tank 36 through line 46 by closing valve 54 and opening valve 48. The concentrated white latex paint can be recovered and reused as an off-white latex paint product. Similarly, a color concentrate of color waste water treated in the evaporator 30 can be discharged through line 45 to line 52 for collection in collecting tank 38 by opening valve 54 and closing valve 48. Recovered concentrated color latex paint products can be reused as color or dark stain latex paint products.

Figure 3:
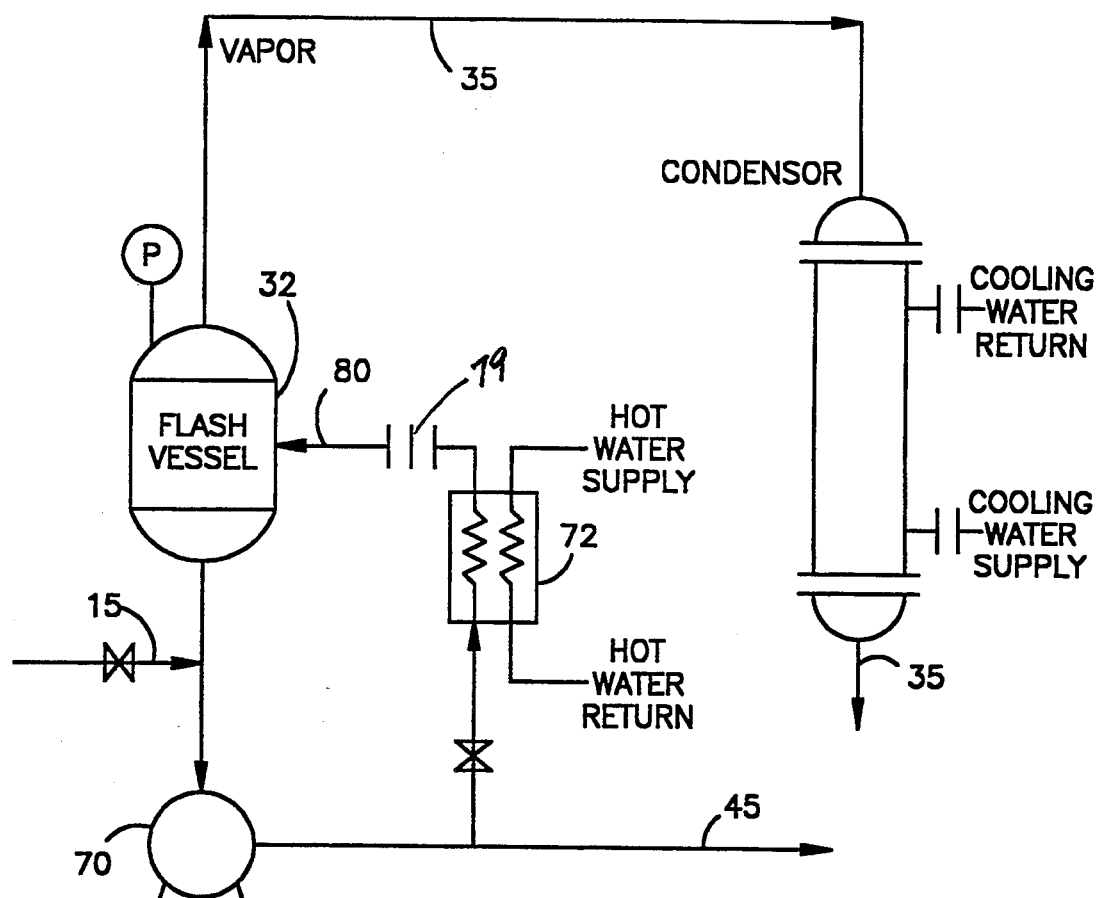
FIG. 3 is a more detailed representation of a preferred evaporator separator unit shown in FIG. 2.

Shown in FIG. 3 is a preferred vacuum evaporator separation unit 30 comprising a flash vessel 32 which operates at elevated temperatures and at reduced pressures to effectively produce the distillate stream 35 and the concentrated latex paint stream 45. The vacuum evaporator unit 30 can be a batch or continuous flow operation. The operating temperatures of the evaporator unit 30 can be above 100° F. and preferably between about 120° F. and 170° F. The preferred temperature T should be around 140° F. to 150° F. to minimize or avoid latex degradation, coagulation and flocculation. To facilitate waste boiling at preferred temperatures, reduced pressures P in flash vessel 32 can be as low as 17 inches of mercury vacuum while advantageously between about 25 and 28 inches of mercury vacuum, although a vacuum of about 27 inches of mercury is preferred. The evaporator unit 32 produces an evaporated distillate aqueous stream 35 containing about 99% water and ordinarily above 99% by weight water and as high as 99.8%–99.9% by weight water with contaminants being primarily volatile organic such as alcohols while solid contaminants being essentially nil.

In FIG. 3, the preferred vacuum evaporating process for recovering waste latex paint solids in accordance with this invention comprises a suppressed boiling/forced recirculation process wherein evaporation takes place under vacuum at reduced temperatures within the flash vacuum evaporator vessel 32 to avoid thermal degradation in conjunction with forced recirculation. Forced recirculation comprises a recirculation pump 70 and a plate heat exchanger 72 operatively interconnected to the evaporator flash unit 32 where the very high recirculation rates provide a small percent evaporated per pass through the heat exchanger 72. At temperature point T exiting the heat exchanger 72, the maximum processing temperature typically is below 170° F., but preferably below 150° F. and most preferably below 140° F. In the flash vessel 32, minimum vacuum P is above about 17 inches of mercury but advantageously above 25 inches and preferably between about 26 and 28 inches of mercury vacuum. For example, 25 inches of mercury vacuum in flash unit 32 would enable an operating temperature of 133° F. in flash unit 32 while 27 inches of mercury would enable 114° F. in flash unit 32. Use of forced recirculation through the heat exchanger 72 increases pressure in the recirculating stream through pump 70 and heat exchanger 72 whereby flash evaporation occurs when recirculating stream 80 passes through an orifice 79 (or similar pressure reduction means) and enters the flash vessel 32. Although the recirculated dilute aqueous latex paint stream 80 can be at a slight negative pressure upon entering the orifice 79 (or other pressure reduction means), recycle stream 80 preferably is maintained under positive pressure between about 0 and 20 psig while passing through the heat exchanger 72 and orifice 79 to prevent boiling within the heat exchanger 72. Upon passing through the orifice 79, a pressure drop occurs along with a temperature drop. The orifice 79 can be outside or inside the flash vessel 32 while stream 80 typically enters the flash vessel 32 tangentially approximate to the outer wall of flash vessel 32. The recirculated stream 80 advantageously enters the flash vessel 32 under pressure and preferably at a temperature between about 120° F. and 150° F. The recirculating stream 80 flashes upon crossing the orifice 79 and enters the flash vessel 32 operating under a vacuum preferably above 25 inches of mercury vacuum. On a pilot scale, useful recirculation rates were found to range from about 0.25 GPM to about 5 GPM while evaporation rates ranged from about 0.5 to about 4.5 GPH. Based on analytical analysis, the aqueous distillate can exceed 99.8% by weight water while the trace contaminants included cosolvents and alcohols. The evaporated latex paint concentrates produced from white wash water were not significantly different in terms of quality from the original paints used in the wash water inasmuch the evaporation process did not degrade the latex paint properties.

In accordance with the continuous process of this invention, the flash vessel 32 is operated under vacuum while dilute latex paint feed 15 enters the recirculating stream at ordinary pressure. The flash vessel 32 can fill to about one-third full by closing valve 53 in the first step before complete recirculating is started. During the recirculating process, the latex paint feed 15 is regulated by a level controller on flash vessel 32 where high level accumulation within flash vessel 32 will operate to reduce or shut-off feed 15 while low level will increase the volume of feed 15. Similarly, a viscosity control operative between the pump 70 and the heat exchanger 72 operates valve 53 where low viscosities below the weight solids latex paint desired operate to maintain valve 53 closed while higher viscosities in the desired range of latex paint solids operate to partially open valve 53 and result in continuous discharge of a minor portion of the recycle. The batch process operates similarly except the feed and discharge are operated intermittently at the beginning and end of each batch.

It has been found that the foregoing latex paint wash water recovery system works very efficiently to recover white and color latex paint waste left in manufacturing plants after the latex paint is discharged for filling. However, white latex paints containing zinc oxide were found to be rather unstable after recovery and hence, should be diverted with incompatible wash water to the flocculation unit 60 instead of the evaporator unit 30. Alternatively, unstable zinc oxide paints can be stabilized with surfactant and evaporated in accordance with this invention. Recovered color latex paint waste concentrates were found to exhibit minor inferior paint film properties, particularly scrub resistance, but this deficiency was overcome by adding minor amounts of organic co-solvent to compensate for losses in the evaporator 30. Color latex paint wastes from various sources may also encounter unexpected coagulation or flocculation in various process steps, probably due to the interaction of dissimilar products using different surfactants, but this problem can be resolved by adding latex and surfactant prior to discharging the color waste stream 14 to the evaporator 30. Lower processing temperatures and higher solids waste water streams minimized or eliminated instability problems such as coagulation.

EXAMPLE

A waste latex paint stream was produced by mixing together equal parts of four different commercial latex paints (Glidden Y-3100, Y-3200, Y-3400, Y-3700) to provide a mixture having a NVM (non-volatile-material) above 40% by weight. This mixture was diluted with water to simulate routine equipment cleaning of latex manufacturing equipment to produce a dilute waste water stream containing about 10.5% NVM by weight latex paint solids. The dilute waste latex paint was re-concentrated in accordance with the process steps of this invention as illustrated in FIGS. 2 and 3. The evaporator unit 30 was utilized on a batch process basis at a temperature of about 140° F. and a negative pressure of 27.25 inches of mercury vacuum. Recirculation rate through pump 70 and heat exchanger 72 and flash evaporator unit 32 was at approximately 3 GPM. The distillate obtained in stream 35 was approximately 99.9% by weight water while the re-concentrated paint stream 46 collected in unit 36 was approximately 43.5% NVM by weight. The re-concentrated paint was compared for physical properties with the original paint mixture and the results are shown in Table 1 below.

TABLE 1

| Property | Original Paint | Re-Concentrated Paint |
|---|---|---|
| Shim Scrub | 100% | 79% |
| Porosity | 97.04% | 98.55% |
| Viscosity (KU) | | |
| Initial | 106 | 106 |
| 7 days oven | 106 | 106 |
| 30 days oven | 106 | 107 |
| 30 days roll | 103 | 102 |
| pH | | |
| Initial | 8.06 | 7.82 |
| 7 days oven | 7.52 | 7.36 |
| 30 days oven | 7.09 | 7.00 |
| 30 days roll | 7.75 | 7.52 |
| Gloss | | |
| Initial | 3.3 | 3.5 |
| 7 days oven | 3.3 | 3.5 |
| 30 days oven | 3.1 | 3.2 |
| 30 days roll | 3.2 | 3.3 |
| Sheen | | |
| Initial | 5.6 | 6.9 |
| 7 days oven | 5.7 | 6.9 |
| 30 days oven | 5.3 | 6.1 |
| 30 days roll | 5.4 | 6.4 |
| Yellow Index | | |
| 7 days oven | 3.49 | 2.74 |
| 7 days room temp. | 2.64 | 2.31 |
| 30 days oven | 4.30 | 3.31 |
| 30 days room temp. | 2.92 | 2.53 |
| 30 days roll | 2.79 | 2.39 |
| 30 days room temp. | 2.77 | 2.42 |

The process of this invention for recovering latex paint wastes typically generated by clean manufacturing equipment has been specifically described but is not intended to be limited except by the appended claims.

I claim:

1. In a process for recovering latex paint from dilute aqueous latex paint collected from cleaning latex paint manufacturing equipment, the process steps comprising:
   providing dilute aqueous latex paint having a concentration below about 30% by weight latex paint solids;
   vacuum evaporating the dilute aqueous latex paint by passing the dilute aqueous latex paint through a vacuum evaporator operating at temperatures between about 100° F. and 170° F. and at a vacuum of at least about 17 inches of mercury vacuum to produce a distillate stream containing about 99% or more by weight water and a concentrated aqueous latex paint stream; and
   collecting the concentrated aqueous latex paint stream for reuse in latex paint products.

2. The process of claim 1 where the dilute aqueous latex paint is collected in a holding tank prior to vacuum evaporation and has a concentration between about 1% and 25% by weight latex paint solids.

3. The process of claim 1 where the dilute aqueous latex paint collected prior to vacuum evaporation contains between about 3% and 15% by weight latex paint solids.

4. The process of claim 1 where the vacuum evaporator operates at a temperature between about 120° F. and 170° F.

5. The process of claim 1 where the vacuum evaporator operates at a vacuum of at least about 25 inches of mercury vacuum.

6. The process of claim 1 where the vacuum evaporator operates at a vacuum of at least about 27 inches of mercury vacuum.

7. The process of claim 1 where the concentrated aqueous latex paint stream from the evaporator comprises at least about 35% by weight paint solids.

8. The process of claim 1 where the concentrated aqueous latex paint stream from the evaporator comprises at least about 40% by weight paint solids.

9. The process of claim 1 where the distillate stream is collected and reused as make up water in new latex paint.

10. The process of claim 1 where the distillate stream is collected and reused for cleaning latex paint manufacturing equipment.

11. The process of claim 1 where latex paint collected comprises white, off-white, and color pigmented latex paints, and white and off-white dilute latex paints are collected separately from dilute aqueous color pigmented latex paint, where the white and off-white dilute latex paints are vacuum evaporated separate from the dilute aqueous color pigmented latex paint.

12. The process of claim 1 where the vacuum evaporator operating temperature is below about 150° F.

13. The process of claim 1 where the vacuum evaporator operating temperature is below about 140° F.

14. The process of claim 1 where the vacuum evaporator comprises a flash vacuum evaporator in combination with forced recirculation of dilute aqueous latex paint to the flash vacuum evaporator.

15. The process of claim 14 where the forced recirculation of dilute aqueous latex paint includes suppressed boiling under positive pressure within a heat exchanger prior to being recirculated to the flash vacuum evaporator.

16. The process of claim 15 where the recirculated dilute aqueous latex paint exits the heat exchanger under positive pressure.

17. The process of claim 15 where the recirculated dilute aqueous latex paint exits the heat exchanger and passes through a pressure reduction means prior to entering the flash vacuum evaporator.

18. The process of claim 1 where the vacuum evaporator is operatively interconnected with a recirculating stream comprising a portion of the dilute aqueous latex paint being processed in the vacuum evaporator, where the recirculated stream re-enters the vacuum evaporator under positive pressure and at a temperature between about 120° F. and 150° F.

19. The process of claim 14 where the forced recirculation of latex paint is maintained at a positive pressure up to about 20 psig prior to re-entering the flash vacuum evaporator.

20. The process of claim 14 where the forced recirculation of latex paint is heated under positive pressure above 0 psig but below 20 psig within a heat exchanger to a temperature between about 120° F. and 150° F. where boiling is avoided within the heat exchanger.

* * * * *